Figures 1, 2:
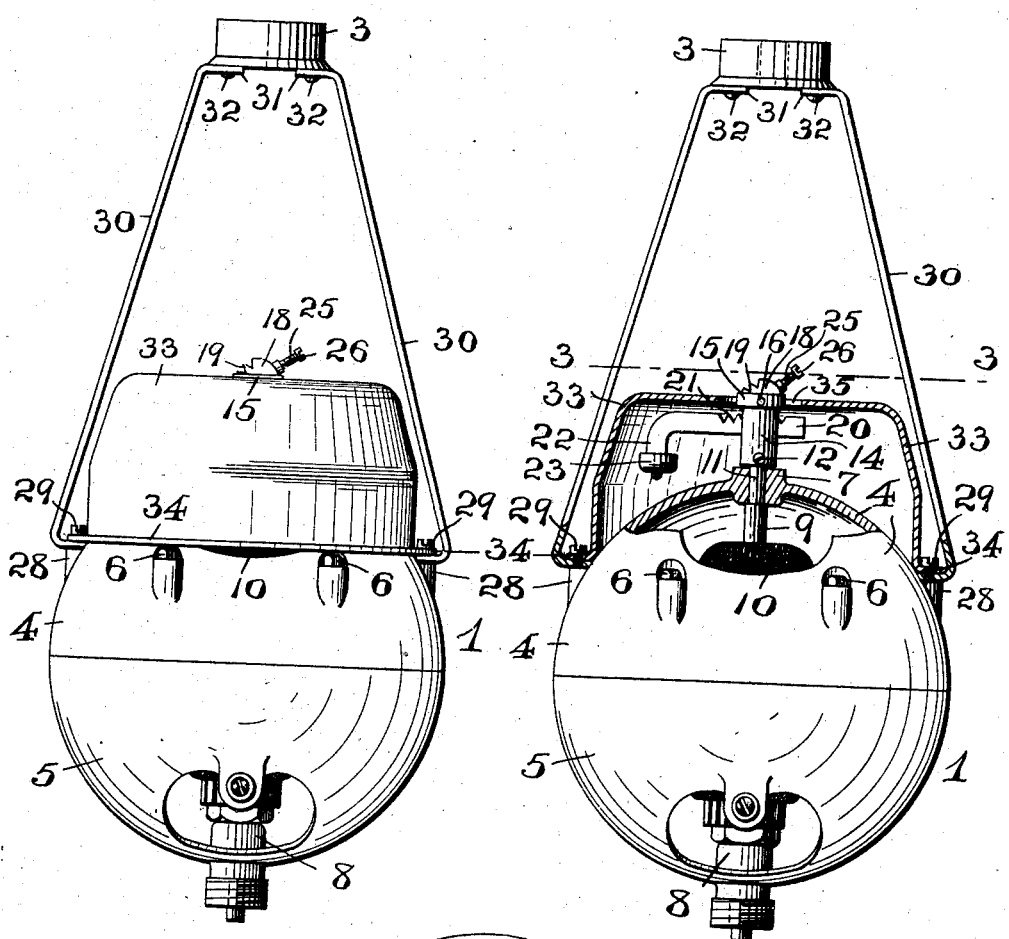

No. 864,528. PATENTED AUG. 27, 1907.
F. B. FUCHS.
VIBRATOR OR MASSAGE INSTRUMENT.
APPLICATION FILED OCT. 19, 1906.

3 SHEETS—SHEET 1.

WITNESSES:
Anna H. Alter
Fredrick Jamison

INVENTOR:
Frederick B. Fuchs,
BY Fraentzel and Richards
ATTORNEYS.

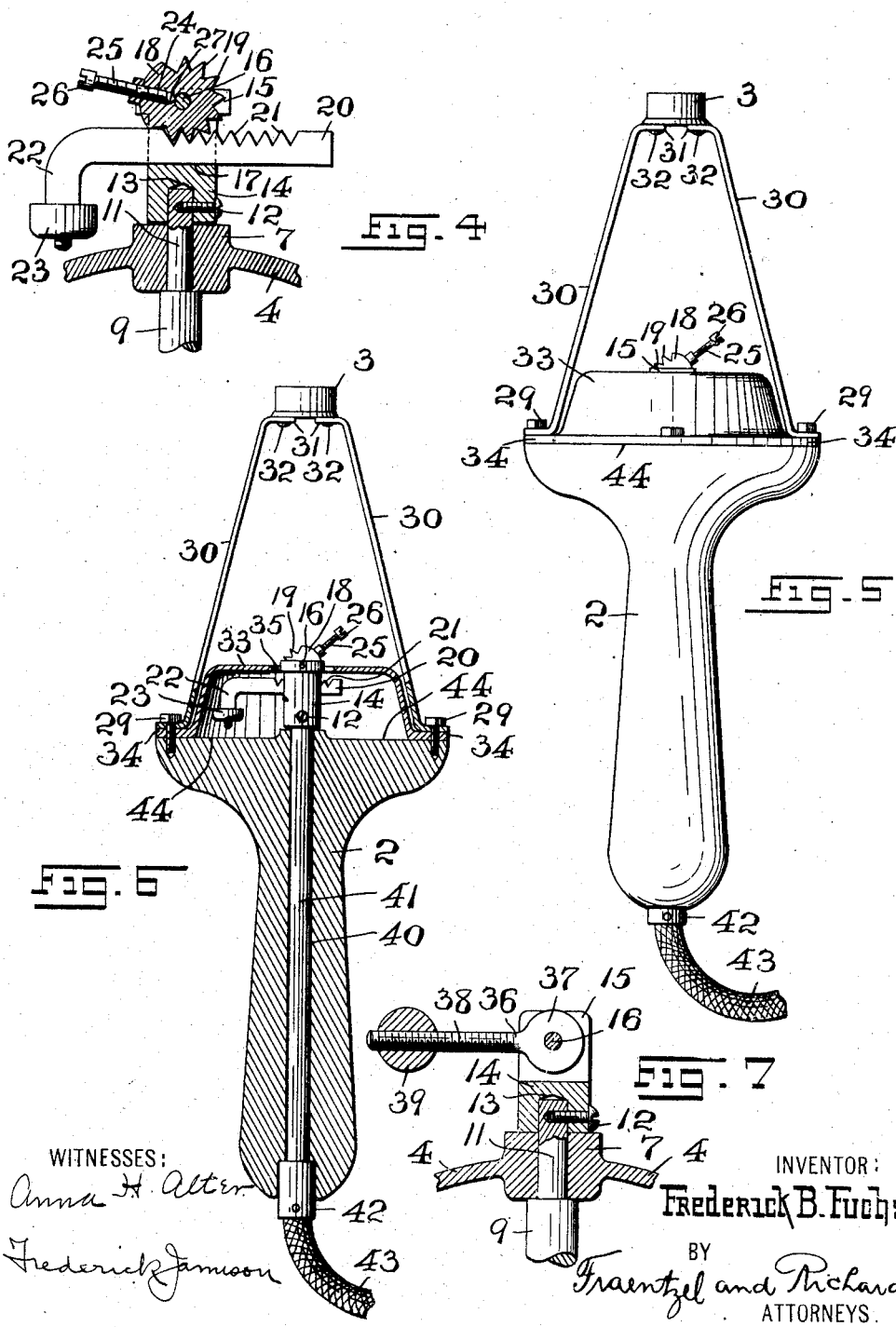

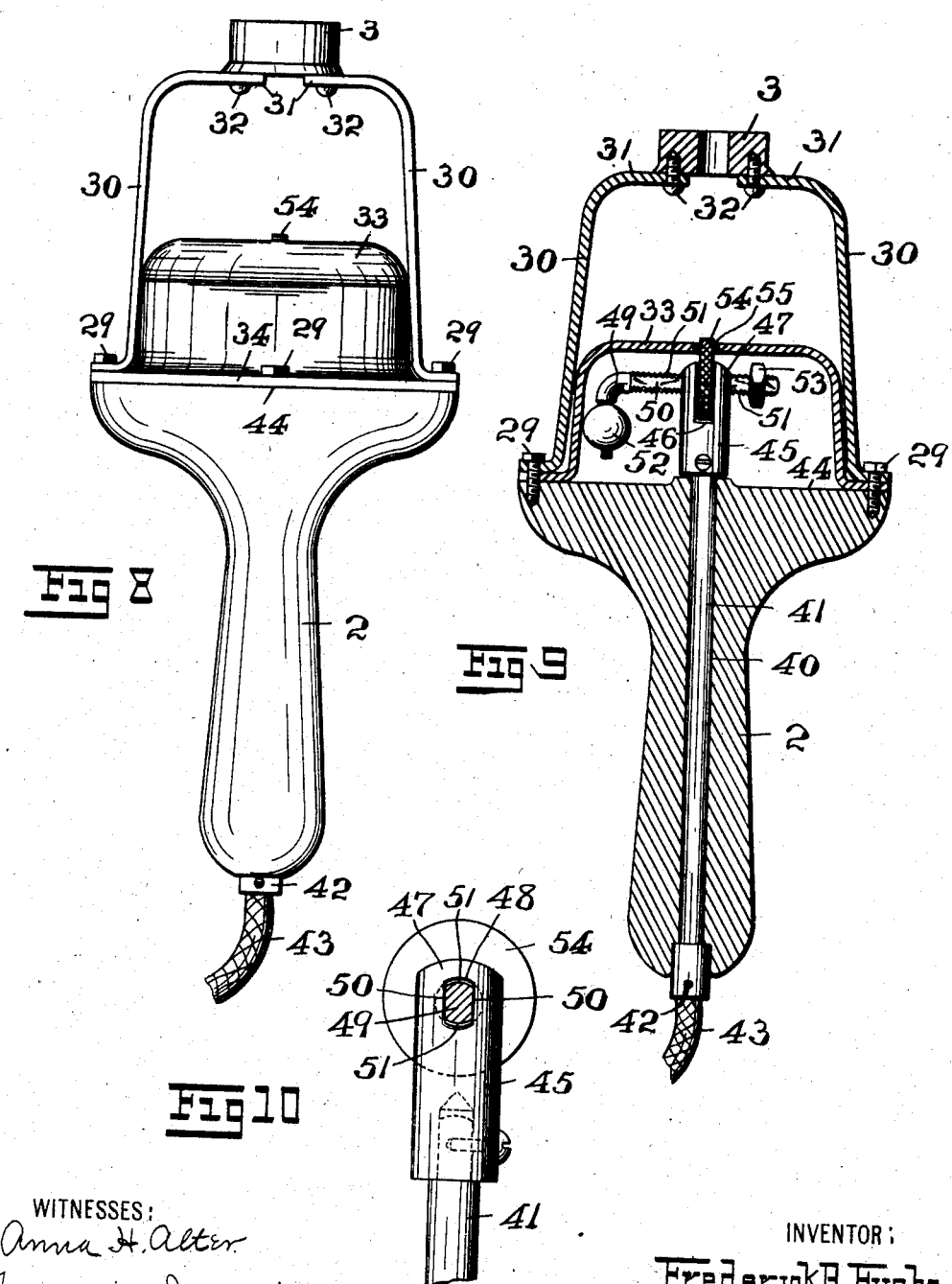

UNITED STATES PATENT OFFICE.

FREDERICK B. FUCHS, OF NEWARK, NEW JERSEY.

VIBRATOR OR MASSAGE INSTRUMENT.

No. 864,528.  Specification of Letters Patent.  Patented Aug. 27, 1907.

Application filed October 19, 1906. Serial No. 339,604.

*To all whom it may concern:*

Be it known that I, FREDERICK B. FUCHS, a citizen of the United States, residing at Newark, in the county of Essex and State of New Jersey, have invented certain new and useful Improvements in Vibrators or Massage Instruments; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference, generally, to that class of instruments or apparatus known in the art as vibrators or massaging devices in which there is a contact-device or element having a vibratory action, said device or element being placed in contact with the parts of the body of a person under treatment; and, the invention relates, more particularly, to a novel vibrator or massage-instrument in which the contact-device or element is spring-supported with relation to a base or handle, and receives its vibratory action indirectly through the vibratory actions of the base or handle, the same carrying a power-driven shaft, instead of directly from a revolving shaft or a reciprocatory crank-arm, as is usually the practice in massage-instruments now in ordinary use.

The present invention, therefore, has for its principal object to provide a novel vibrator or massage-instrument comprising a base or handle which is provided with a power-driven shaft, and a vibratory contact device or element which has a fixed relation to said base or handle, and is in nowise connected directly with the revolving shaft, said contact-device or element being carried by an arm or arms having their lower portions connected directly with the base or handle, and having sufficient spring-like or resilient action, whereby the vibratory action of the base or handle is imparted through said arm or arms to the contact device or element.

A further object of this invention is to provide a vibrator or massage-instrument in which all the movable parts of the instrument are protected or concealed so as not to be exposed, and that there can be no danger of the operator coming in contact with the movable parts, whereby serious injury might result; and, furthermore, to provide a simply constructed and efficiently operating instrument provided with a readily adjustable means for controlling and regulating the vibrations which are thus indirectly imparted to the contact device or element.

Other objects of this invention not at this time more particularly mentioned will be clearly understood from the following detailed description of the present invention.

With the various objects of my present invention in view, the said invention consists primarily in the novel vibrator or massage-instrument hereinafter set forth; and, furthermore, this invention consists in the various arrangements and combinations of devices and their parts, as well as in the details of the construction of the same, all of which will be more fully described in the following specification and then finally embodied in the clauses of the claims which are appended to and which form an essential part of this specification.

The invention is clearly illustrated in the accompanying drawings, in which:—

Figure 3:
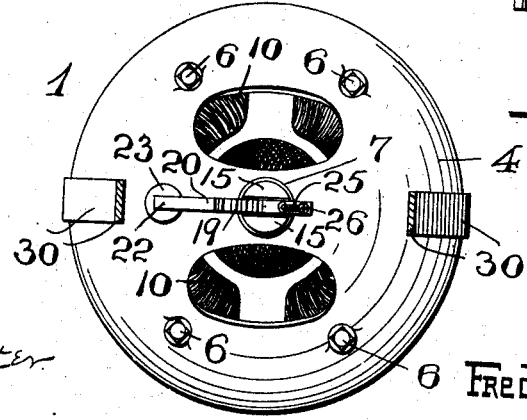

Figure 1 is a front elevation of one form of vibrator or massage-instrument, embodying the principles of this invention; Fig. 2 is a view of the same, partly in elevation and partly in vertical section, showing in side elevation one form of means connected with the power-driven shaft for controlling and regulating the vibrations; and Fig. 3 is a horizontal section, taken on line 3—3 in said Fig. 2, with the protecting shell or hood removed, and showing the base in which the motor-driven shaft and its motor are arranged in top view. Fig. 4 is a detail view, partly in vertical section and partly in elevation, of a portion of the said base and revolving shaft, showing the controlling or regulating means in another one of its adjusted relations, all the parts being represented on an enlarged scale. Fig. 5 is a front view of the vibrator or massage instrument, in which the base is made in the form of a handle, and in which the vibrator-shaft is driven from a flexible shaft operated from a source of power outside of the handle; and Fig. 6 is a vertical sectional representation of the handle and the shell or hood shown in said Fig. 5, but illustrating the vibrator-shaft, the adjustable controlling or regulating means, the vibratory contact-device or element and the supporting arms, in elevation. Fig. 7 is a sectional representation, similar to that indicated in Fig. 4, and of the same parts there illustrated, but showing a slightly modified form of controlling or regulating means. Fig. 8 is a front view, and Fig. 9 a vertical sectional representation of a vibrator or massage-instrument provided with an adjustable controlling or regulating means of a modified construction, said controlling or regulating means being shown in front elevation; and Fig. 10 is a side view of said adjustable controlling and regulating means and a cross-section of its movable arm or bar, said view being made on an enlarged scale.

Similar characters of reference are employed in all of the above described views, to indicate corresponding parts.

Referring now to the several figures of the drawings, the reference-character 1 in Figs. 1 to 3 inclusive indicates a suitable base, and 2 in Figs. 6 and 7 a suitable handle, both of which are taken in the hand by the operator when the vibratory contact-device or element 3 is placed for massaging or vibratory purposes against the body of the person under treatment. The body or base 1 consists usually of two hollow hemi-spheres or sections 4 and 5, which are secured together preferably by means of screws 6, substantially as indicated in the drawings. Rotatively mounted in bearings 7 and 8 of the respective sections 4 and 5 is a vibrator-shaft 9 which is revolved from a suitable electric motor 10 carried by said shaft, and revolving with said shaft within the chamber formed by the two connected sections or shells 4 and 5. The upper end-portion 11 of said shaft extends beyond the bearing 7 and secured thereon by means of a screw 12, or in any other suitable manner, is the socketed portion 13 of a post or stud 14, said post being provided upon its upper portion with a pair of upwardly extending and perforated ears or lugs 15, said ears providing a laterally extending space between them, substantially as shown in the several figures of the drawings. A pin 16 has its ends arranged and secured in the perforations of said ears or lugs, said pin having, under normal conditions, rotatably arranged thereon a suitable ratchet or toothed wheel 18, the teeth 19 of which are in operative mesh with the teeth 21 of a rack or bar 20. This rack or bar is slidably disposed upon the upper flat surface 17 of the post or stud 14, being arranged between the inner faces of said lugs or ears, which serve as guides between which the rack or bar 20 can be moved in a backward and forward manner by means of the ratchet-wheel 18, substantially in the manner to be presently more fully described. Upon one of the ends, of the rack or bar 20, the end being preferably curved downwardly, as at 22, and as shown, is secured in any desired manner, a counterweight or balance 23. That the said ratchet or toothed wheel may be rotated in either direction upon the pin 16, to cause the engaging teeth 19 and 21 to move the rack or bar 20 into its adjusted position, and then to lock the parts in their adjusted positions, the ratchet wheel is provided with a screw-threaded socket 24 into which is screwed the screw-portion of a screw 25, the portion of the screw which projects from the edge of the ratchet or toothed wheel being provided with a head or fingerpiece 26 for the manipulation of the screw which serves as a lever for actuating the ratchet-wheel. To partially rotate the ratchet-wheel in either direction, the end 27 of the screw 25 is slightly disengaged from its holding engagement with the pin 16, and the ratchet-wheel is thereupon turned the required degree to slide the rack or bar 20 into its adjusted position, desired by the operator. After the parts have been properly adjusted, the screw is again turned by means of its head or fingerpiece, and the end 27 of the screw is again brought in its firm binding engagement with the pin 16, as will be clearly evident. The vibratory regulating and controlling means is thus fixed immovably in its adjusted position with relation to the vibrator-shaft 9 which can then be set in motion.

Extending upwardly from and secured to screw-receiving sockets 28 upon the section or shell 4, by means of screws 29, or in any other suitable manner, are a pair of vibrator-arms 30, said arms being made of a spring-like metal having resilient properties, and said arms extending toward each other near the top and being provided with bent end-members 31 which are perforated for the reception of screws 32, and by means of which is secured upon said end-members the previously mentioned vibrating contact-device or element 3.

To protect the operator against contact with the revolving shaft and the regulating and controlling means carried upon the upper end of the shaft when the instrument is being used, a shell or hood 33 having a flange 34 which is provided with holes or perforations is secured by means of the screws 29 between the arms 30 and above the section 4, substantially as shown in Figs. 1 and 2 of the drawings, said shell or hood 33 having in its top an opening 35 through which a portion of the ratchet-wheel and its screw extend, and which is sufficiently large to permit the oscillatory movements of these parts.

In lieu of the regulating and controlling means hereinabove described and illustrated in Figs. 1 to 6 inclusive, a slightly modified form of regulating or controlling means represented in Fig. 7 of the drawings may be employed. In this construction, instead of the ratchet-wheel 18 and the sliding rack or bar 20, an arm 36 having an eye 37 is pivoted upon the pin 16, so as to be capable of an oscillatory motion between the two ears or lugs 15 of the post 14, said arm having a screw-threaded portion 38 upon which is screwed and is adjustable upon said screw-portion, a ball or balance 39, as clearly illustrated in said Fig. 7 of the drawings.

Instead of the spherical body or shell shown in Figs. 1, 2 and 3 of the drawings, and in which is arranged the vibrator-shaft which carries the electric motor 10, a suitable handle 2, see Figs. 5 and 6, may be used, this handle being provided with a longitudinally extending tubular bearing-portion 40, in which is rotatably arranged a shaft or spindle 41, said shaft having suitably secured upon its lower end-portion a connection 42 of an ordinary flexible shaft 43 which may be attached to an outside source of power for the purposes of driving said shaft or spindle. Upon the opposite end-portion of the shaft which projects beyond the flat end 44 of the handle, is the regulating and controlling means mentioned hereinabove and shown in connection with the construction of vibrator or massage-instrument indicated in said Figs. 1, 2 and 3 of the drawings.

The instrument shown in Figs. 6 and 7, similarly to that shown in said Figs. 1, 2 and 3, is provided with the hood or shell 33, the vibrator-arms 30 and the contact-device or element 3, the several parts being arranged and connected with the flat end of the handle by means of the screws 29, substantially in the manner shown.

In Figs. 8, 9 and 10 of the drawings, is shown a vibrator or massage-instrument which is provided with another modified form of regulating and controlling means. In this construction there is secured upon the upper end of the vibrator shaft 41, a post 45 which is slotted or bifurcated at its upper end, as at 46, thus providing a pair of supporting lugs 47 both of which are made with the elongated or flat-sided openings 48, as clearly shown in Fig. 10. Movably arranged in said flat-sided openings is a rod or bar 49, said rod being flattened on its opposite sides, as at 50, and having the upper and lower screw-threaded portions 51, as clearly shown. At one end the said bar is provided with a weight or counter-balance 52, and upon its upper end there may be arranged a stop 53, usually in the form of a nut. Rotatably arranged upon the screw-threaded portions of said rod or bar 49, and disposed in the slotted portion 46 formed by the lugs 47 is a knurled wheel or nut 54, the upper marginal edge of said wheel or nut extending through a suitably formed opening or slot 55 in the shell or casing 33, substantially as shown in Figs. 8 and 9 of the drawings. It will be noticed that by applying a pressure upon this projecting portion of said wheel or nut 55 the latter is turned and thus produces a slidable movement of the bar or rod 49, in either direction according to the turning of said nut, within the said shell or casing 33, the flattened sides of the said rod or bar and the straight edges of the openings 48 preventing the turning of said rod or bar 49.

It will be seen from the foregoing description of my present invention that I have produced a simply constructed vibrator or massage-instrument, in which the contact-device which is placed upon the body of the person to be treated, receives its vibrations indirectly from the vibrator-shaft, thus rendering the treatment less severe; and, furthermore, by the use of the adjustable regulator or controller which is attached to the vibrator-shaft, the vibrations or shocks can be increased or decreased to any desired degree according to circumstances and according to the condition of the person under treatment.

I claim:

1. A vibrator or massage-instrument comprising a body, a rotary shaft having a portion extending from said body, upwardly extending arms connected with said body, a contact-element supported by said arms, all arranged that the rotary action of the shaft will vibrate said body and through said arms transmit the vibrations to said contact-element, and a protector-shell connected with said body, said shell being arranged over the projecting end of said shaft.

2. A vibrator or massage-instrument comprising a body, a rotary shaft having a portion extending from said body, a pair of resilient and spring-like arms connected with said body, a contact-element supported by said arms, all arranged that the rotary action of the shaft will vibrate said body and through said arms transmit the vibrations to said contact-element, and a protector-shell connected with said body, said shell being arranged over the projecting end of said shaft.

3. A vibrator or massage-instrument comprising a body, a rotary shaft having a portion extending from said body, a pair of resilient and spring-like arms connected with said body, said arms extending upwardly from said body and being inclined toward each other, an inwardly bent end-member upon each arm, a contact-element arranged against said end-members, means for securing said contact-element upon said end-members of said arms, all arranged that the rotary action of the shaft will vibrate said body and through said arms transmit the vibrations to said contact-element, and a protector-shell connected with said body, said shell being arranged over the projecting end of said shaft.

4. A vibrator or massage-instrument comprising a body, a rotary shaft having a portion extending from said body, upwardly extending arms connected with said body, a contact-element supported by said arms, all arranged that the rotary action of the shaft will vibrate said body and through said arms transmit the vibrations to said contact-element, a controlling device upon said shaft for controlling the vibratory action, and a protector-shell connected with said body, said shell being arranged over the projecting end of said shaft, substantially as and for the purposes set forth.

5. A vibrator or massage-instrument comprising a body, a rotary shaft having a portion extending from said body, a pair of resilient and spring-like arms connected with said body, a contact-element supported by said arms, all arranged that the rotary action of the shaft will vibrate said body and through said arms transmit the vibrations to said contact-element, a controlling device upon said shaft for controlling the vibratory action, and a protector-shell connected with said body, said shell being arranged over the projecting end of said shaft, substantially as and for the purposes set forth.

6. A vibratory or massage-instrument comprising a body, a rotary shaft having a portion extending from said body, a pair of resilient and spring-like arms connected with said body, said arms extending upwardly from said body and being inclined toward each other, an inwardly bent end-member upon each arm, a contact-element arranged against said end-members, means for securing said contact-element upon said end-members of said arms, all arranged that the rotary action of the shaft will vibrate said body and through said arms transmit the vibrations to said contact-element, a controlling device upon said shaft for controlling the vibratory action, and a protector-shell connected with said body, said shell being arranged over the projecting end of said shaft, substantially as and for the purposes set forth.

7. A vibrator or massage-instrument comprising a body, a rotary shaft, a contact-element, and a connection between said contact-element and said body, all arranged that the rotary action of the shaft will vibrate said body and through said connections transmit the vibrations to the contact-element, and a controlling device upon said shaft for controlling the vibratory action, consisting of a post attached to the end of the shaft, a rack slidably connected with said post, a weight carried by said rack, and an oscillatory ratchet-wheel having its teeth in mesh with said rack for setting the same, substantially as and for the purposes set forth.

8. A vibrator or massage-instrument comprising a body, a rotary shaft, a contact-element, and a resilient and spring-like metal connection forming a support between said contact-element and said body, all arranged that the rotary action of the shaft will vibrate said body and through said connections transmit the vibrations to the contact-element, and a controlling device upon said shaft for controlling the vibratory action, consisting of a post attached to the end of the shaft, a rack slidably connected with said post, a weight carried by said rack, and an oscillatory ratchet-wheel having its teeth in mesh with said rack for setting the same, substantially as and for the purposes set forth.

9. A vibrator or massage-instrument comprising a body, a rotary shaft having a portion extending from said body, upwardly extending arms connected with said body, a contact-element supported by said arms, all arranged that the rotary action of the shaft will vibrate said body and through said arms transmit the vibrations to said contact-element, a controlling device upon said shaft for controlling the vibratory action, consisting of a post attached to the end of the shaft, a rack slidably connected with said post, a weight carried by said rack, an oscillatory ratchet-wheel having its teeth in mesh with said rack for setting the same, and a protector-shell connected with said body, said shell being arranged over the projecting end of said shaft, substantially as and for the purposes set forth.

10. A vibrator or massage-instrument comprising a body, a rotary shaft having a portion extending from said body, a pair of resilient and spring-like arms connected with said body, a contact-element supported by said arms, all arranged that the rotary action of the shaft will vibrate said body and through said arms transmit the vibrations to said contact-element, a controlling device upon said shaft for controlling the vibratory action, consisting of a post attached to the end of the shaft, a rack slidably connected with said post, a weight carried by said rack, an oscillatory ratchet-wheel having its teeth in mesh with said rack for setting the same, and a protector-shell connected with said body, said shell being arranged over the projecting end of said shaft, substantially as and for the purposes set forth.

11. A vibrator or massage-instrument comprising a body, a rotary shaft, a pair of resilient and spring-like arms connected with said body, said arms extending upwardly from said body and being inclined toward each other, an inwardly bent end-member upon each arm, a contact-element arranged against said end-members, and means for securing said contact-element upon said end-members of said arms, all arranged that the rotary action of the shaft will vibrate said body and through said arms transmit the vibrations to said contact-element, and a controlling device upon said shaft for controlling the vibratory action, consisting of a post attached to the end of the shaft, a rack slidably connected with said post, a weight carried by said rack, and an oscillatory ratchet-wheel having its teeth in mesh with said rack for setting the same, substantially as and for the purposes set forth.

12. In a vibrator or massage-instrument, the combination with a body carrying a vibratory contact-element, of a rotary shaft, a post upon said shaft, an oscillatory ratchet wheel upon said post, a rack slidably arranged with relation to said post, said ratchet-wheel being in mesh with said rack, and a locking means for securing said ratchet-wheel and the rack against movement with relation to said shaft.

13. In a vibrator or massage-instrument, the combination with a body carrying a vibratory contact-element, of a rotary shaft, a post upon said shaft, a pair of upwardly extending ears upon said post, a pivotal pin carried by said ears, a ratchet-wheel loosely mounted upon said pin, a rack slidably arranged with relation to said post, said ratchet-wheel being in mesh with said rack, substantially as and for the purposes set forth.

14. In a vibrator or massage-instrument, the combination with a body carrying a vibratory contact-element, of a rotary shaft, a post upon said shaft, a pair of upwardly extending ears upon said post, a pivotal pin carried by said ears, a ratchet-wheel loosely mounted upon said pin, a rack slidably arranged with relation to said post, said ratchet-wheel being in mesh with said rack, and a locking means for rigidly connecting said ratchet-wheel with said pin, substantially as and for the purposes set forth.

15. In a vibrator or massage-instrument, the combination with a body carrying a vibratory contact-element, of a rotary shaft, a post upon said shaft, a pair of upwardly extending ears upon said post, a pivotal pin carried by said ears, a ratchet-wheel loosely mounted upon said pin, a rack slidably arranged with relation to said post, said ratchet-wheel being in mesh with said rack, and said ratchet-wheel being provided with a screw-receiving socket, a screw screwed into said socket, said screw serving normally as a lever for oscillating said ratchet-wheel, and means upon said screw for turning its end in holding engagement with said pin for rigidly connecting the ratchet-wheel with the pin, substantially as and for the purposes set forth.

16. In a vibrator or massage-instrument, the combination, with a body carrying a vibratory contact-element, of a rotary shaft, said shaft having a portion projecting from said body, a controlling device upon said end of the shaft, and a protector-shell connected with said body, said shell being arranged over the projecting end of the shaft and the controller thereon, substantially as and for the purposes set forth.

17. In a vibrator or massage-instrument, the combination, with a body carrying a vibratory contact-element, of a rotary shaft, said shaft having a portion projecting from said body, an adjustable controlling device upon said end of the shaft, a protector-shell connected with said body, said shell having an opening in its top and being arranged over the projecting end of the shaft and the controller thereon, and means connected with said controller for adjusting the same, said means extending through the opening in said shell for manipulation, substantially as and for the purposes set forth.

In testimony, that I claim the invention set forth above I have hereunto set my hand this 18th day of October, 1906.

FREDERICK B. FUCHS.

Witnesses:
 FREDK. C. FRAENTZEL,
 FREDERICK JAMISON.